United States Patent [19]

Xu et al.

[11] Patent Number: 5,134,174

[45] Date of Patent: Jul. 28, 1992

[54] POLYPROPYLENE MICROPOROUS FILM

[75] Inventors: Mao Xu; Shiru Hu; Jiayu Guan; Xianming Sun; Wei Wu; Wei Zhu; Xian Zhang; Zimian Ma; Qi Han; Shangqi Liu, all of Beijing, China

[73] Assignee: Institute of Chemistry, Academia Sinica, China

[21] Appl. No.: 786,090

[22] Filed: Oct. 31, 1991

[30] Foreign Application Priority Data

Nov. 13, 1990 [CN] China ............................. 90109050.6

[51] Int. Cl.$^5$ ...................... B29C 55/00; B29C 49/08
[52] U.S. Cl. ................................ 521/143; 264/288.4; 264/290.2; 521/918
[58] Field of Search ............................. 521/143, 918; 264/288.4, 290.2

[56] References Cited

U.S. PATENT DOCUMENTS

| 4,100,238 | 7/1978 | Shimomura | 521/61 |
| 4,386,129 | 5/1983 | Jacoby | 521/94 |
| 4,975,469 | 12/1990 | Jacoby | 521/84.1 |

Primary Examiner—Morton Foelak
Attorney, Agent, or Firm—Marshall & Melhorn

[57] ABSTRACT

Polypropylene microporous films characterized by having a porosity of 30–35%, an average pore size of 200–800 Angstroms, a permeation coefficient for nitrogen of $1-5\times10^{-3}$ ml/cm sec atm and a tensile strength of greater than 60 MPA in all directions within the film plane are prepared by the consecutive steps of biaxial stretching a non-porous starting film of high $\beta$-crystal content and heat setting the stretched film.

4 Claims, 3 Drawing Sheets

POLYPROPYLENE MICROPOROUS FILM

BACKGROUND OF THE INVENTION

1. Field of the Invention

The present invention relates to a novel polypropylene microporous film and to the process for producing the film.

The porous films of the present invention are open-celled films having pores essentially connected with each other through tortuous paths which may extend from one surface to the other of the films. The dimensions of the pores and the intersections of the tortuous paths within the porous films of the present invention are in the microscopic range and are usually less than the wavelength of visible light.

The microporous films of the present invention are characterized by their porosity, i.e. the volume content of the pores within them, pore structure, permeation to nitrogen and tensile properties, all of which serve to distinguish the films from those of the prior art.

2. Summary of the Prior Art

Polypropylene microporous films have been produced and described, for example in U.S. Pat. No. 3,801,404 and European Pat. No. 0,108,601 A2. In the former patent a stretching method was described. The preferred procedure of preparation involves the consecutive steps of uniaxial cold stretching and hot stretching a non-porous semicrystalline polypropylene elastic film. Stretching method is economic and technologically convenient because no solvents are required. As a result of uniaxial stretching the pores are slitlike, and anisotropy of films in mechanical properties is obvious. The tensile strength in lateral direction is very low, say about 10 MPa is usual.

The method of preparing polypropylene microporous films described in European Pat. No. 0,108,601 A2 is essentially a solution cast method comprising heating a mixture of about 30 percent polypropylene and about 70 percent N,N'-bis(2-hydroxyethyl)tallowamine by weight to form a homogeneous solution, casting or extruding said solution onto a chill roll to form a solid sheet and removing at least a substantial portion of the liquid from the sheet to form the microporous polypropylene film. These films may have higher porosity, but this method can not avoid the trouble in dealing with a large amount of solvents as compared to the stretching method.

Polypropylene microporous films ar attractive in many applications including medical, controlled release, electrochemical, battery separator and microfiltrations. There has existed a need in the art of a polypropylene microporous film having a pore size rating of 0.05 micron and a narrow pore size distribution, which may have high porosity and permeation to gas and liquid combined with good mechanical properties. Also needed is a preparation method being feasible for production of higher rates.

SUMMARY OF THE INVENTION

The object of the present invention is to provide novel polypropylene microporous films and method for producing these microporous films which have a better combination of high porosity and permeation to fluids, narrow pore size distribution and improved mechanical properties than known polypropylene microporous films of the prior art.

The present invention provides a novel stretching method for preparing polypropylene microporous films from uniform non-porous, crystalline starting films with high content of $\beta$-crystals. The process steps include (1) biaxial stretching the starting film to create microporous structure, (2) heat setting the resulting porous film under biaxial tension to get further increase of porosity and to impart thermal stability of the porous structure to the final film product.

Uniform polypropylene starting film with high content of $\beta$-crystals are obtained by extruding polypropylene granule with nucleating agents.

The polypropylene microporous films of the present invention, are characterized by having a porosity of 30–40% and more usually 30–35%, an average pore size of 100 to 2000 Angstroms and more usually 200 to 800 Angstroms, a narrow distribution of pore size. The permeation coefficient of films to nitrogen can be up to $1-5 \times 10^{-3}$ ml/cm sec. atm., preferably greater than $2 \times 10^{-3}$ ml/cm sec. atm. The mechanical properties are rather uniform in all directions within the film plane, the tensile strength in all directions is larger than about 60 MPa, preferably larger than about 70 MPa.

The essence of the present invention is the use of uniform polypropylene starting films of high content of $\beta$-crystals and the special biaxial stretching technology which impart to microporous films the unique porous structure, pore morphology and mechanical properties.

Other aspects and advantages of the present invention will become apparent to one skilled in the art to which the present invention pertains from the following more detailed description of preferred embodiments when read in conjunction with the appended drawings.

DESCRIPTION OF THE PREFERRED EMBODIMENTS

Figure 1:
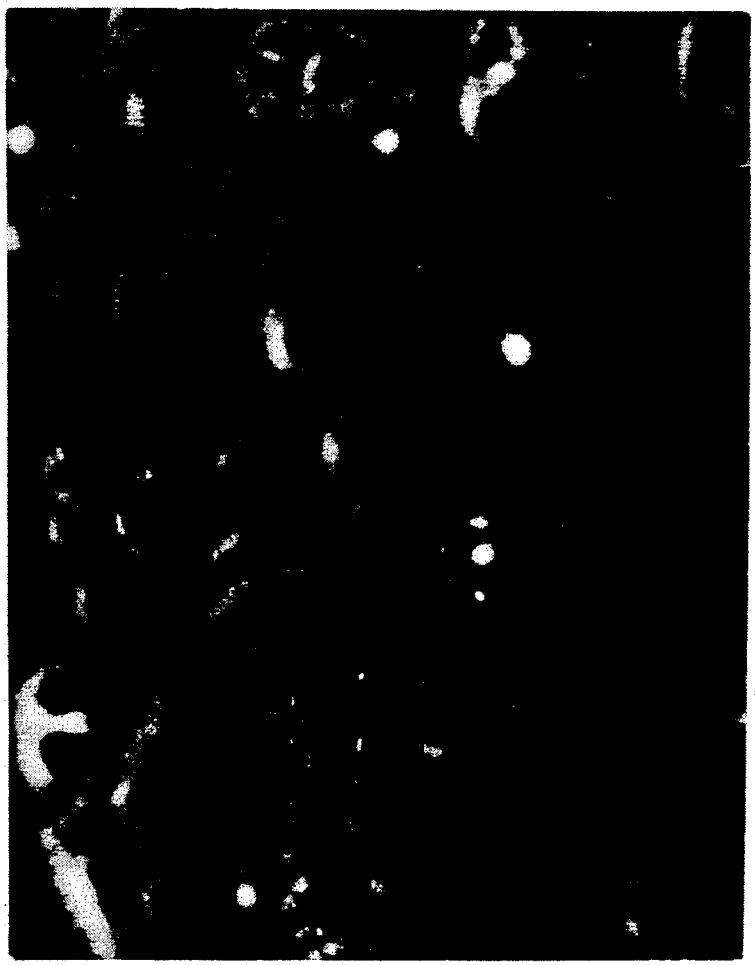
FIG. 1 is a scanning electron microscopy photograph of a polypropylene microporous film of the present invention at magnification of 72,500.

The microporous films of the present invention are prepared from starting polypropylene crystalline films of high $\beta$-crystal content. Isotactic polypropylene is known to exhibit several crystal modifications. The monoclinic $\alpha$-modification is commonly observed. The hexagonal $\beta$-modification is usually obtained during crystallization under special crystallization conditions or crystallization in the presence of nucleating agents. Nucleating agents for polypropylene to form $\beta$-crystals have been described, for example, in Chinese Pat. No. 1,004,076 B, Angew. Makromol. Chem. 94,213(1981) and J. Appl, Polym. Sci., 36,995(1988). Nucleating agents of the prior art are used in the present invention for preparing the starting non-porous films.

Commercially available film-forming polypropylenes can be used to prepare the starting film of the present invention. It is preferred to employ an isotactic polypropylene having an isotacticity higher than 96%, a melt index from about 0.1 to 70, preferably about 0.5 to 30.

The types of apparatus suitable for preparing the starting films of this invention are well known in the art. Form example, a conventional screw extruder equipped with a coat hanger die is satisfactory. Polypropylene resin with nucleating agents is introduced into a hopper of the extruder. The resin is melted and transferred by the screw to the die from which it is extruded through a slot in the form of a film from which it is drawn by a take-up or casting roll.

The melt temperature for film extrusion is, in general, no higher than about 100° C. above the melting temperature of polypropylene and no lower than the melting temperature. A temperature range of about 180° C. to about 250° C. is preferable in the present invention.

The relative degree of β-crystallinity of the starting film used in the present invention is characterized in terms of a K value which is well known in literature and is defined as follows:

$$K = I_{\beta(300)}/I_{\beta(300)} - I_{a(110)} - I_{a(040)} - I_{a(130)}$$

where $I_{a(hkl)}$ and $I_{B(hkl)}$ are the intensities of the (hkl) X-ray wide angle diffraction of the Δ- and β-modifications respectively. The K value is zero in the absence of the β-modification and is unity, if only the β-modification is present in the film. The K value of starting films used for preparing microporous polypropylene film of the present invention is, in general, larger than 0.5, and preferably larger than 0.7.

The uniformity of β-crystal content within the starting film is very important for obtaining high permeability of microporous polypropylene film of the present invention. The starting films are sliced into thin pieces for determinating the K values of different layers. If there are thin layers of low β-content in some places along the thickness direction of the starting film, the permeability of the resulted microporous film may be lowered 2–3 order of magnitudes or even more.

The cooling process of the slot-cast film is controlled in order to obtain uniform starting films with higher content of β-crystal. The temperature suitable for cooling the as-extruded film is preferably in the range of about 80° C. to 135° C. In the present invention more than one take-up or casting rolls in various combinations are used to improve the uniformity of the starting films. Another possible technique for this purpose is to cool the as-extruded film by using a combination of a casting drum and an air stream. In both methods the temperature of the rolls, drum and air stream should be well controlled. It is preferable to have a hood around the rolls or the drum, so as the ambient temperature becomes more controllable and more stable.

The uniform starting films with higher K value are then subjected to the biaxial stretching process of this invention to form the novel microporous films. In this process a starting film is stretched in two directions perpendicular to each other. Different modes of biaxial stretchings, sequential biaxial stretching and simultaneous biaxial stretching, are suggested in the present invention. In order to get improved mechanical properties the microporous films obtained in the stretching processes mentioned herein above may be subjected to additional stretching in the longitudinal direction, or the machine direction.

The amount of stretching in each directions is characterized by the conventional parameter, draw ratio, while the amount of the biaxial stretching process is characterized in terms of area ratio which is defined as follows:

Area ratio = Area of specimen after stretching / Area of specimen before stretching In the stretching process of the present invention the draw ratios in two perpendicular directions are preferably to have equal values, or at least values of small difference.

Almost equal strain rates in the two directions are usually suggested for simultaneous biaxial stretching. While in the case of sequential biaxial stretching the drawings in the two directions may be carried out at slightly different temperatures and strain rates.

The temperature for biaxial stretching of the present invention is in the range from about 80° C. to 140° C., preferably in the range from about 90° C. to 130° C.

The structure and properties of the starting film are changed obviously in the stretching process. The amount of biaxial stretching, including simultaneous and sequential biaxial stretchings, for preparing microporous films of the present invention is ranging from about 1.5 to about 20, and preferably from about 2 to about 10.

The strain rate may also give its influence on preparing microporous film. The strain rate suggested in the present invention is less than 10 min$^{-1}$ for the deformation of the film in each direction.

After the biaxial stretching process the stretched microporous film is heat set at substantially constant dimension. The heat setting may be carried out at a temperature in the range from about 90° C. to 155°) C., and preferably from about 110° C. to 140°) C.

The period of heat setting treatment which is preferably carried out sequentially with and after the biaxial stretching process is suggested in the present invention to be within about 0.1 min. to 30 min., and preferably within about 0.5 min. to 5 min.

FIG. 1 is a scanning electron microscopy photograph of a surface portion of a microporous film of the present invention. As can be seen from FIG. 1 there are holes of circular or almost circular section distributed uniformly on the surface of the microporous film. The diameter of these holes is about 300–1000 Angstroms.

The microporous films of the present invention have a porosity greater than 20% and up to 30–40%, more usually in the range of 30–35%. The porosity is defined as the volume content of the pores and is determined according to the following equation:

$$\text{Porosity} = V_p/V_f = (V_f - V_r)/V_f$$

where $V_f$ is the gross volume of the microporous film which consists of two parts, the volume occupied by the polymer resin $V_r$ and the volume occupied by the pores $V_p$, respectively.

Figure 2:
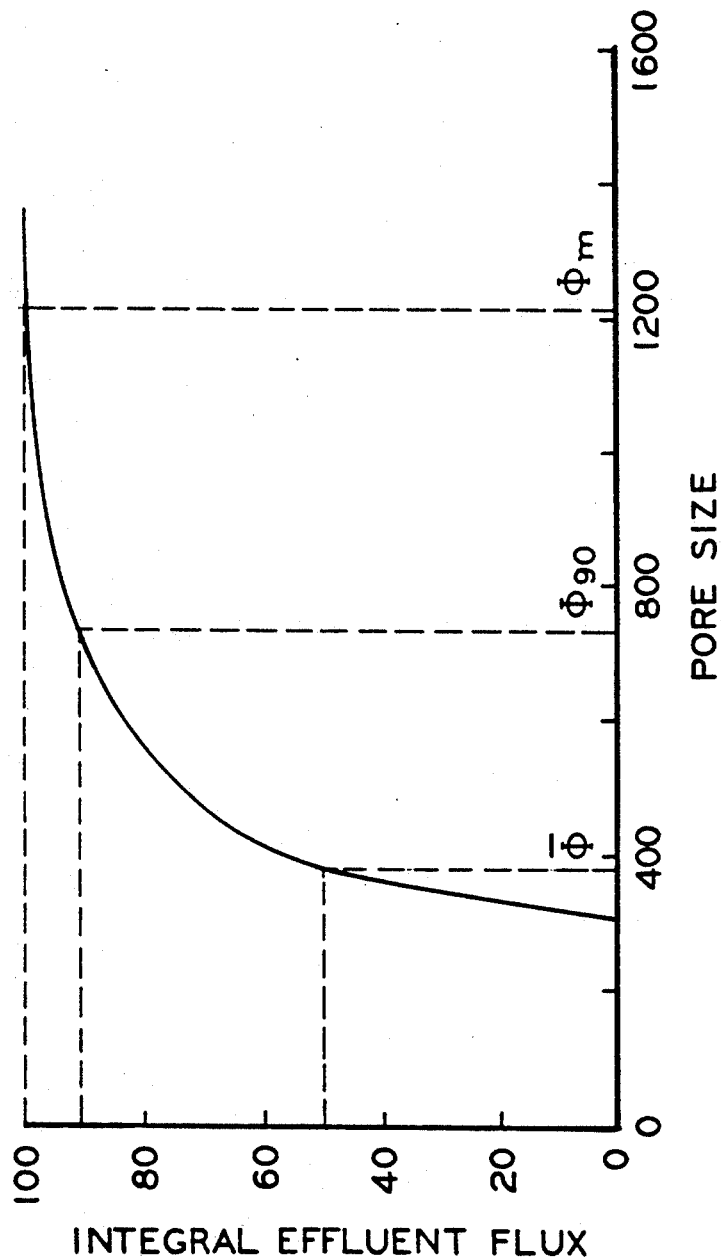
FIG. 2 is an integral effluent flux-pore diameter curve of a polypropylene microporous film of the present invention.

The microporous film of the present invention may have an average pore size of 100 to 2000 Angstroms and more usually 200 to 800 Angstroms. The values of pore size are determined by a combination of the bubble-pressure and solvent permeability methods, as described by R. E. Kesting in "Synthetic Polymeric Membranes" 2nd Ed., John Wiley & Sons, 1985. An integral effluent flux-pore size curve can be obtained by using the mentioned combined method. FIG. 2 shows the curve determined for a microporous film of the present invention. The average pore size $\Phi_{av}$ is defined as the size corresponding to 50% integral flux. Pore size distribution can be characterized by two ratios $R_{90}$ to $R_m$. They are defined as follows:

$$R_{90} = \Phi_{90}/\Phi_{av}$$

$$R_m = \Phi_m/\Phi_{av}$$

where $\Phi_m$ is the maximum pore size and $\Phi_{90}$ is the size corresponding to 90% integral flux as shown in FIG. 2. $R_{90}$ and $R_m$ for microporous films of the present invention are usually less than about 2 and 3 respectively. The narrow distribution of pore size is a distinguishing characteristic of the microporous film of the present invention with respect to those of the prior art and is important in applications of the films as filtration media.

The microporous film of the present invention is also characterized by its high permeability to gases and liquids. The permeation coefficient of the microporous films of the present invention to nitrogen at 25° C. is usually larger than $5 \times 10^{-4}$ ml/cm sec. atm, and preferably up to about $1-5 \times 10^{-3}$ ml/cm sec. atm. The permeation coefficient is defined as follows:

$$P = Qd / pAt$$

where Q is the volume of the effluent permeated through a film of area A and thickness d in a time period t under pressure difference p across the film.

The microporous film of the present invention is also characterized by its good mechanical properties as compared to those of the prior art. The tensile properties are rather uniform in all directions within the film plane. The tensile strength of the films is larger than about 60 MPa up to about 120-150 MPa. The elongation at break of the films is larger than about 30% up to about 150-200%, and the Young's modulus is ranging from about 0.4 GPa to about 1.2 GPa. An Instron tensile tester is used for tensile property measurements with dumpbell specimens of effective length of 25 mm at a draw rate of 100 mm/min.

Polypropylene microporous films are hydrophobic in nature. They may become hydrophilic by means of physical or chemical modifications introducing hydrophilic groups on the surface of the films, so as to meet the needs of applications with aqueous systems.

EXAMPLE 1

A Specimen of a starting polypropylene film with K value of 0.85 was biaxially stretched at 110° C. in a simultaneous mode to an area ration of 2.7 under equal strain rate of 1.3 min$^{-1}$ in the two axis directions. A microporous film was obtained having an average pore size of 690 Angstroms and a nitrogen permeation coefficient of $1.73 \times 10^{-3}$ ml/cm sec. atm.

EXAMPLE 2

A specimen of a starting polypropylene film with K value of 0.84 was biaxially stretched at 110° C. in a simultaneous mode to an area ratio of 6. A microporous film was obtained after the stretching process. The porosity of the resulting microporous films was then measured at different places of a piece of the specimen, its area is about 500 cm$^2$. The results are listed in Table 1. The average porosity is 30.4% with little fluctuations.

TABLE 1

| Results of porosity measurements | |
|---|---|
| No | Porosity, % |
| 1 | 30 |
| 2 | 31 |
| 3 | 29 |
| 4 | 30 |
| 5 | 31 |
| 6 | 30 |
| 7 | 33 |
| 8 | 30 |
| 9 | 30 |
| 10 | 30 |
| Average value | 30.4 |

EXAMPLE 3

A specimen of a starting polypropylene film with K value of 0.8 was biaxially stretched at 110° C. in a simultaneous mode to an area ratio of 5. A microporous film was obtained having an average pore size of 470 Angstroms and a pore size distribution with $R_{90} = 1.87$.

EXAMPLE 4

Figure 3:
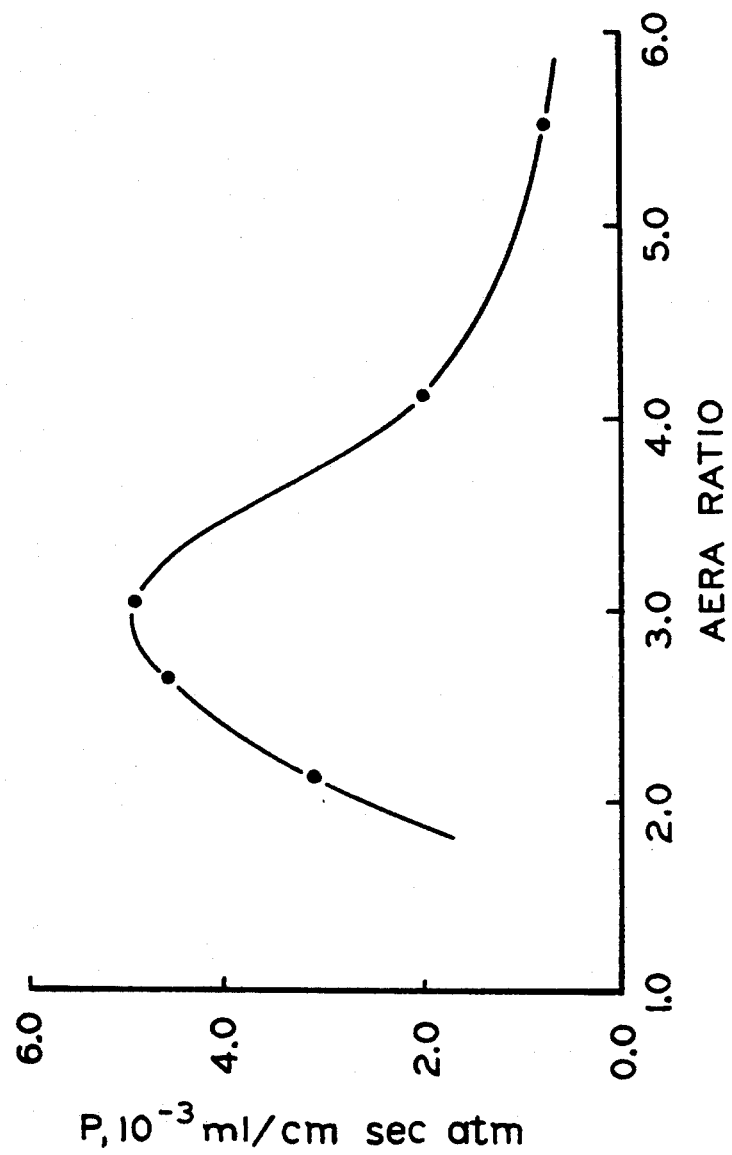
FIG. 3 is a graph illustrating the effect of area ratio of stretching on the permeation coefficient to nitrogen of the polypropylene microporous films.

Specimens of a starting film with a K value of 0.82 were biaxially stretched at 115° C. in a sequential mode to different area ratios. The permeation coefficient to nitrogen of the resulting microporous films was then determined. The results are shown in FIG. 3 as a function of the area ratio. The permeation coefficient exhibits a maximum at an area ratio of about 3.

EXAMPLE 5

Specimens of a starting polypropylene film with a K value of 0.82 were biaxially stretched at 115° C. in a simultaneous mode to different area ratios. The tensile properties of the resulting microporous films were measured at 20° C. The results are listed in Table 2.

TABLE 2

| | Mechanical properties of microporous films | | | |
|---|---|---|---|---|
| Sample | Area ratio | Modulus, GPa | $\sigma$, MPa | $\epsilon$, % |
| 1 | 4.4 | 0.51 | 70 | 135 |
| 2 | 7.8 | 0.65 | 105 | 75 |
| 3 | 10.2 | 0.67 | 93 | 60 |
| 4 | 13.0 | 1.08 | 133 | 40 |

$\sigma$ - tensile strength, $\epsilon$ - elongation at break.

EXAMPLE 6

Specimens of starting polypropylene films with various K values were biaxially stretched at 115° C. in simultaneous mode to a same area ratio. The average pore size and permeation coefficient for nitrogen of the resulting microporous films were measured and the results are listed in Table 3.

TABLE 3

| Effect of K value on the properties of microporous films | | |
|---|---|---|
| K | P, ml/cm sec atm | 101 $_{avg}$ Å |
| 0.57 | $2.03 \times 10^{-3}$ | 630 |
| 0.66 | $3.00 \times 10^{-3}$ | 502 |
| 0.69 | $2.10 \times 10^{-3}$ | 732 |
| 0.79 | $4.35 \times 10^{-3}$ | 766 |

EXAMPLE 7

A specimen of a starting polypropylene film with a K value of 0.71 was stretched biaxially at 120° C. in a simultaneous mode to an area ratio of 4.1. A microporous film was obtained after the stretching process. An emulsion of crosslinked polystyrene/acetone having particles of an average size of 600 Angstroms was filtrated through the resulting microporous film under a pressure difference of 2.5 atm. Clean and transparent liquid was obtained after the filtration.

The principles, preferred embodiments and examples of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

What is claimed is:

1. An open-celled polypropylene microporous film prepared by stretching an uniform starting film of high $\beta$-crystal content characterized by having an average pore size of about 100-2000 Anstroms, a permeation coefficient for nitrogen of about $1-5 \times 10^{-3}$ ml/cm sec. atm, also characterized by uniform tensile properties, having a tensile strength of 60-150 MPa in all directions within the film plane.

2. An open-celled polypropylene microporous film of claim 1 characterized by having a porosity of about 30-40% and having an average pore size of 200 to 800 Angstroms.

3. An open-celled polypropylene microporous film of claim 1 or claim 2 characterized by having a narrow pore size distribution with a ratio of $R_{90}$ less than about 2.

4. An open-celled polypropylene microporous film of claim 1 characterized by having an elongation at break of about 30-200% and a Young's modules of about 0.4-1.2 GPa.

* * * * *